(No Model.)
G. A. SLOCUM.
TWO WHEELED VEHICLE.
No. 466,581. Patented Jan. 5, 1892.
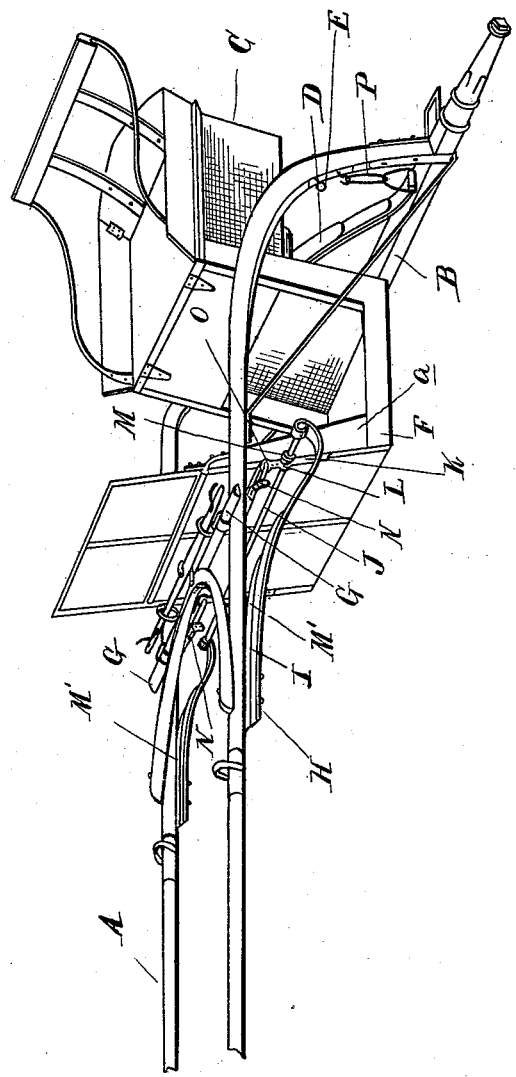
Witnesses.
A. L. Knobbe
M. B. O'Dogherty
Inventor
George A. Slocum
By Thos. S. Sprague & Son
Att'ys

United States Patent Office.

GEORGE A. SLOCUM, OF NEW HAVEN, MICHIGAN.

TWO-WHEELED VEHICLE.

SPECIFICATION forming part of Letters Patent No. 466,581, dated January 5, 1892.

Application filed May 27, 1891. Serial No. 394,306. (No model.)

*To all whom it may concern:*

Be it known that I, GEORGE A. SLOCUM, a citizen of the United States, residing at New Haven, in the county of Macomb and State of Michigan, have invented certain new and useful Improvements in Two-Wheeled Vehicles, of which the following is a specification, reference being had therein to the accompanying drawing.

This invention relates to new and useful improvements in two-wheeled vehicles; and the invention consists in the peculiar construction of the body-support, whereby the so-called "horse motion" is largely overcome and an easy-riding cart is constructed, all as more fully hereinafter described.

In the drawing the figure is a perspective view of a vehicle embodying my invention.

A are the shafts.

B is the axle.

C is the body.

D is a semi-elliptical spring upon which the body is supported. This spring is suspended from the hooks E, secured to the under side of the vertical portion of the shaft, a series of these hooks being provided to allow the necessary vertical adjustment. The wheels are not shown. The body is provided at its forward end with the vertical side bars F, forming the sides of the front of the body.

G is a cross-bar.

H are springs, preferably so-called "C-springs," secured at their forward ends to the under side of the shafts at I and at the rear end pivotally attached to the cross-bar J, which is secured to the front or dash portion of the body by means of the straps K, having the bearing L formed therein, and collars M prevent the end motion of said bars upon the body. These cross-bars extend beyond the sides of the body to a point beneath the shaft, so that the springs H may be secured thereto beneath the shafts.

The springs H are provided with the superimposed shorter leaf-springs M', which resist only the upward movement of the springs, allowing the downward movement to be resisted only by the lower spring H.

N are safety-straps secured to the cross-bars at their upper ends and at their lower ends to the eyes O, formed upon the upper end of the straps L.

In the use of this cart the weight of the rider brings the center of gravity in rear of the semi-elliptical spring D, so that there is an upward pressure upon the spring H. This is checked by the tension of that spring and by the superimposed leaf-spring M', but is free to move downward by overcoming the tension of the spring H alone. As the rear of the body is supported by double shackles P, so as to be free to swing in any direction, provision is made for the forward and backward movement of the body by using a C-shaped spring, as plainly shown in the drawing, the curved portion $a$ of which allows of such movement at the front of the body.

In case the occupant should put his full weight in the front of the body of the vehicle, any damage to the spring is prevented by the safety-straps N. The same would be true if a load were placed in the front of the vehicle. This construction gives an easy-riding vehicle with little or no horse motion, the movement of the shafts being taken up in the C-springs before it reaches the seat, and all movements of the body are provided for in the spring-support.

What I claim as my invention is—

1. In a road-cart, the combination, with the shafts and body, of a yielding swinging support for the rear of the body, and springs having leaves on their upper face and secured at their outer ends to the shafts, their inner ends extending rearwardly and downwardly and formed with C-shaped extremities attached to the front of the body, substantially as described.

2. In a road-cart, the combination, with the shafts and body, of a yielding swinging support for the rear of the body, a cross-bar J, secured to the front of the body, reinforced springs having horizontal extensions secured to the shafts and extending back in a substantially horizontal line, their rearward extremities being bent upwardly and secured to the ends of the cross-bars, and straps between the front of the body and shafts, substantially as described.

In testimony whereof I affix my signature in presence of two witnesses.

GEORGE A. SLOCUM.

Witnesses:
THOMAS HULL,
ORAN HAMBLIN.